US006538663B2

(12) United States Patent
Kamei

(10) Patent No.: US 6,538,663 B2
(45) Date of Patent: *Mar. 25, 2003

(54) CAMERA CONTROL SYSTEM

(75) Inventor: Yoichi Kamei, Chofu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,080

(22) Filed: Feb. 17, 1998

(65) Prior Publication Data

US 2001/0013865 A1 Aug. 16, 2001

(30) Foreign Application Priority Data

Feb. 24, 1997 (JP) ............................... 9-039046

(51) Int. Cl.$^7$ ................................. G09G 5/00
(52) U.S. Cl. ................ 345/635; 345/790; 345/794; 348/333.02; 348/333.11; 348/333.12
(58) Field of Search ................ 345/636, 676, 345/619, 635, 618, 797, 790, 788, 794, 352; 348/153, 154, 159, 705, 333.11, 333.12, 211, 212, 333.1, 552, 333.02, 333.05

(56) References Cited

U.S. PATENT DOCUMENTS 4,789,962 A * 12/1988 Berry et al. ................. 364/900
5,687,313 A * 11/1997 Hirosawa et al. ......... 395/183.22
5,712,995 A * 1/1998 Cohn .......................... 359/342
5,771,042 A * 6/1998 Santos-Gomez ............ 345/342
5,825,411 A * 10/1998 Cooper et al. .............. 348/159
5,841,436 A * 11/1998 Nakamura ................... 345/432
5,880,725 A * 3/1999 Southgate ................... 345/430
5,956,032 A * 9/1999 Argiolas ..................... 345/342
6,008,867 A * 12/1999 Cooper et al. .............. 348/705
6,072,478 A * 6/2000 Kurihara et al. ............ 345/302
6,122,005 A * 9/2000 Sasaki et al. ................ 348/211
6,137,485 A * 10/2000 Kawai et al. ................ 348/211
6,167,469 A * 12/2000 Safai et al. .................. 348/211

FOREIGN PATENT DOCUMENTS

EP 0644694 3/1995
EP 0645932 3/1995

OTHER PUBLICATIONS

Patent Abstracts of Japan No. JP 06 215101 A, published Aug. 5, 1994.
Patent Abstracts of Japan No. JP 07 104965 A, published Apr. 21, 1995.

* cited by examiner

*Primary Examiner*—Richard Hjerpe
*Assistant Examiner*—Kimnhung Nguyen
(74) *Attorney, Agent, or Firm*—Robin, Blecker & Daley

(57) ABSTRACT

In order to carry out display control of an operating panel and realize an orderly display of an image picked up by a camera which is being controlled, an empty area in which an image picked up by one or more cameras is not displayed is searched for on a display screen, and a new picked-up image obtained from the one or more cameras is displayed in the empty area found.

15 Claims, 12 Drawing Sheets

F I G. 2
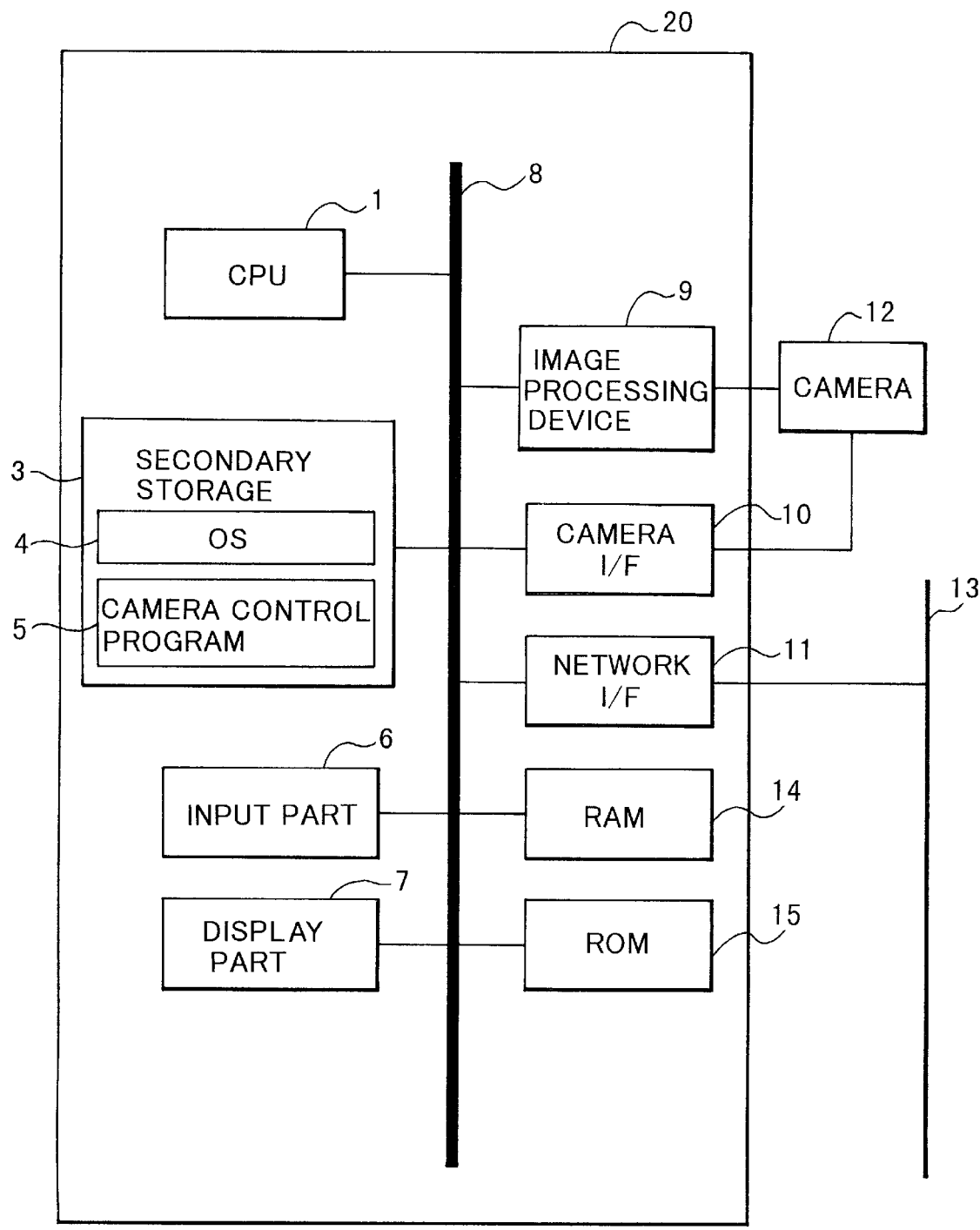

FIG. 7

| NAME OF AREA | COORDINATES OF UPPER LEFT POINT | COORDINATES OF LOWER RIGHT POINT | CAMERA CONTROL |
|---|---|---|---|
| MAXIMUM AREA | 0,0 | 640,320 | — |
| CONTROL AREA | 400,20 | 600,300 | — |
| TERMINAL #1 | 5,5 | 315,235 | × |
| TERMINAL #2 | 5,245 | 315,475 | ○ |

CAMERA CONTROL SYSTEM

BACKGROUND OF THE INVENTION

1. Field of the Invention

The present invention relates to a camera control system suitable for use with surveillance cameras, video conference systems or the like which perform communication of information, for example, via a network.

2. Description of Related Art

In recent years, with the spread of personal computers (hereinafter called PCs) and a further improvement in the performance of communication between computers which is represented by the spread of Ethernet (trademark), video conference systems, surveillance systems or the like are increasingly becoming realized comparatively inexpensively by connecting control terminals such as general-purpose PCs to a network such as the Internet.

For example, if a user transmits a control signal for a camera from a control terminal which is being used by the user, the control signal is received by the camera via a network and the camera is controlled in accordance with the control signal. A video signal obtained from the camera is received by the control terminal via the network and a picked-up image is displayed on the display screen of a CRT or the like.

During this time, control of the camera is executed in such a way that an operating panel provided with operating buttons is displayed on the display screen of the CRT or the like through a GUI (Graphical User Interface) and the user moves a cursor on the display screen with a mouse and clicks on a predetermined one of the operating buttons.

However, if an image obtained from one or more cameras is displayed oh the display screen or a displayed image is magnified, a number of problems will occur. For example, the operating panel for camera control overlaps a picked-up image of a camera to be controlled by the user and the picked-up image is hidden in whole or part by the operating panel, or the camera becomes difficult to operate.

BRIEF SUMMARY OF THE INVENTION

It is, therefore, an object of the present invention to carry out display control of an operating panel and realize an orderly display of an image picked up by a camera which is being controlled.

To achieve the above-described object, in accordance with one embodiment of the present invention, there is provided a camera control system capable of displaying on display means a picked-up image obtained from one or more cameras, which system comprises selecting means for selecting at least one image obtained from the one or more cameras, for displaying purpose, display processing means for displaying an image selected by the selecting means, on the display means in a predetermined size, searching means for searching for an empty area on the display means, other than a display area occupied by the image displayed by the display processing means, and control means for causing a new image obtained from the one or more cameras to be displayed in the empty area found by the searching means, if the new image is additionally selected by the selecting means for displaying purpose.

In accordance with another aspect of the present invention, there is provided a camera control system capable of displaying on display means a picked-up image obtained from one or more cameras, which system comprises selecting means for selecting at least one image obtained from the one or more cameras, for displaying purpose, display processing means for displaying an image selected by the selecting means, on the display means in a predetermined size, an interface displayed on the display means in a predetermined size, for selectively operating the one or more cameras, searching means for searching for an empty area on the display means, other than a display area occupied by the image displayed by the display processing means, and control means for causing the interface to be displayed in the empty area found by the searching means.

In accordance with another aspect of the present invention, there is provided a control method for a camera control system capable of displaying a picked-up image obtained from one or more cameras, on a display screen of a display device, which method comprises a selecting step of selecting at least one image obtained from the one or more cameras, for displaying purpose, a display processing step of displaying an image selected by the selecting step, on the display screen in a predetermined size, a searching step of searching for an empty area on the display screen, other than a display area occupied by the image displayed by the display processing step, and a control step of causing a new image obtained from the one or more cameras to be displayed in the empty area found by the searching step, if the new image is additionally selected by the selecting step for displaying purpose.

In accordance with another aspect of the present invention, there is provided a control method for a camera control system capable of displaying a picked-up image obtained from one or more cameras, on a display screen of a display device, which method comprises a selecting step of selecting at least one image obtained from the one or more cameras, for displaying purpose, a display processing step of displaying an image selected by the selecting step, on the display screen in a predetermined size, an interface displaying step of displaying an interface for selectively operating the one or more cameras, on the display screen in a predetermined size, a searching step of searching for an empty area on the display screen, other than a display area occupied by the image displayed by the display processing step, and a control step of causing the interface to be displayed in the empty area found by the searching step.

In accordance with another aspect of the present invention, there is provided a storage medium which stores a program for executing processing for a camera control system capable of displaying a picked-up image obtained from one or more cameras, on a display screen of a display device, the storage medium allowing the camera control system to execute the following processing: selecting at least one image obtained from the one or more cameras, for displaying purpose, displaying the image selected, on the display screen in a predetermined size, searching for an empty area other than a display area occupied by the image displayed on the display screen, and causing a new image obtained from the one or more cameras to be displayed in the empty area found, if the new image is additionally selected for displaying purpose.

In accordance with another aspect of the present invention, there is provided a storage medium which stores a program for executing processing for a camera control system capable of displaying a picked-up image obtained from one or more cameras, on a display screen of a display device, the storage medium allowing the camera control system to execute the following processing: selecting at least one image obtained from the one or more cameras, for displaying purpose, displaying the image selected, on the display screen in a predetermined size, displaying an interface for selectively operating the one or more cameras, in a predetermined size, searching for an empty area other than a display area occupied by the image displayed on the display screen, and displaying the interface in the empty area found.

The above and other objects, features and advantages of the present invention will become apparent from the following detailed description of a preferred embodiment of the present invention, taken in conjunction with the accompanying drawings.

BRIEF DESCRIPTION OF THE SEVERAL VIEWS OF THE DRAWING

FIG. 2 is a block diagram of the construction of a control terminal according to the embodiment of the present invention;

FIG. 7 is a view showing one example of an area list according to the embodiment of the present invention;

DETAILED DESCRIPTION OF THE INVENTION

A preferred embodiment of the present invention will be described below in detail with reference to the accompanying drawings.

Figure 1:
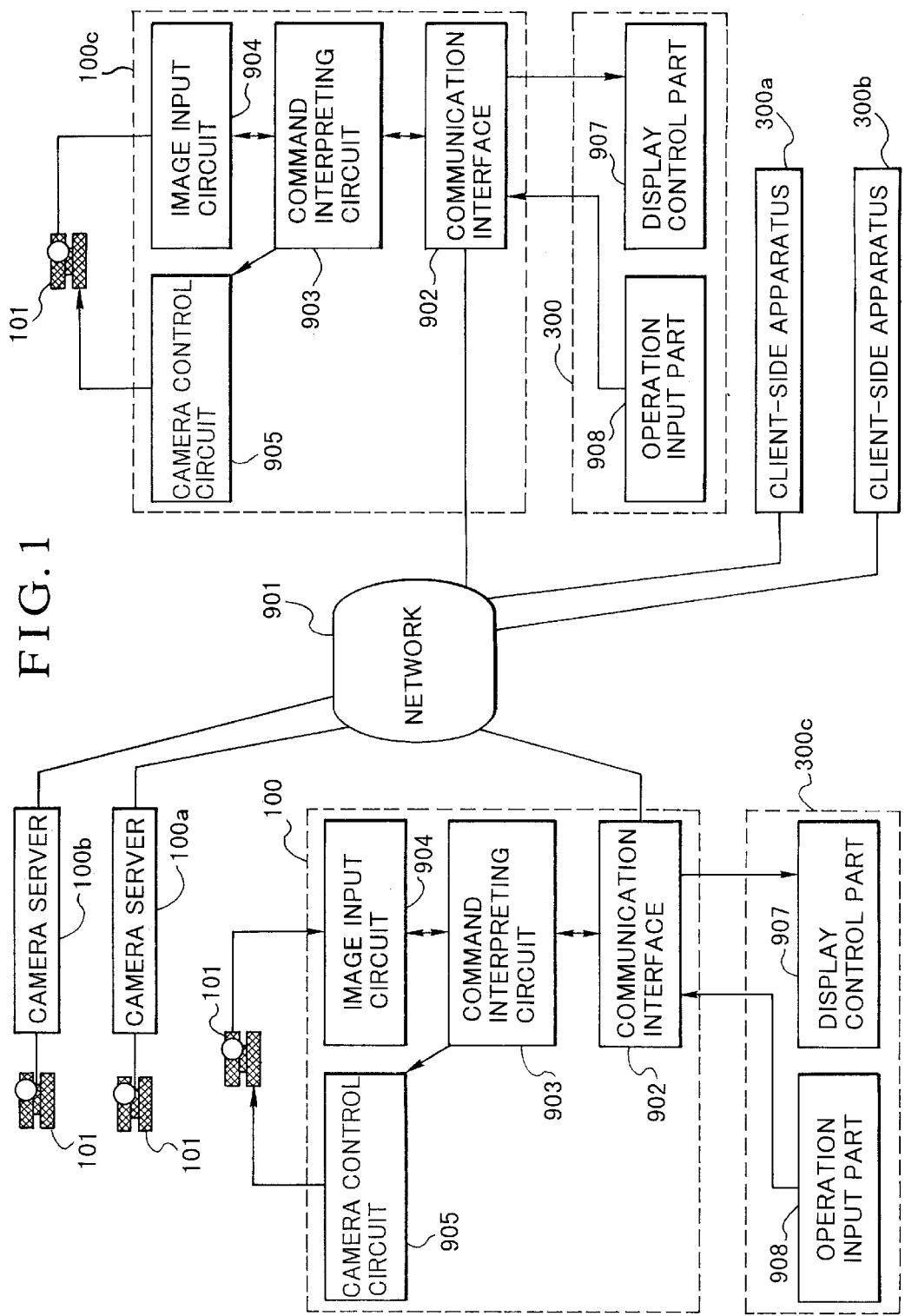
FIG. 1 is a conceptual diagram of a camera control system according to an embodiment of the present invention.

FIG. 1 is a conceptual diagram showing a camera control system according to the preferred embodiment of the present invention.

The camera control system according to the preferred embodiment is connected to a network 901 such as a LAN, a WAN or the Internet. As will be described below in detail, the camera control system is connected to the Internet.

Client-side apparatus 300, 300a, 300b and 300c are situated at remote locations and output camera control commands therefrom. Cameras 101 can be controlled from outside for panning, tilting or zooming, and are respectively connected to camera servers 100, 100a, 100b and 100c. The cameras 101 connected to the camera servers 100, 100a, 100b and 100c are operated in accordance with a control command sent from a client-side apparatus having a camera control right, and signals of input images inputted from the cameras 101 are transmitted to the client-side apparatus.

In the present embodiment, as shown in FIG. 1, a plurality of camera servers and a plurality of client-side apparatus may be individually connected to the network 901, or a plurality of units in each of which a camera server and a client-side apparatus are integrated may be connected to the network 901. Such units each including a camera server and a client-side apparatus are capable of effecting mutual communication which enables a camera situated on one side to be operated on another side via the network 901.

In accordance with the camera control system according to the present embodiment, an infinite number of camera servers and client-side apparatus of the above-described types may be connected to each other via the network. However, the present embodiment can also be accomplished in such a way that one camera server and one client-side apparatus are connected to each other via the network.

In the camera server 100, a communication interface 902 transmits and receives signals to and from each of the camera servers and the client-side apparatus via the network 901. A command interpreting circuit 903 interprets a received signal and transmits a predetermined operation signal to the camera 101 connected to the camera server 100. An image input circuit 904 receives an input image from the camera 101 and performs signal processing on the image. A camera control circuit 905 is provided for controlling a panning, tilting or zooming operation of the camera 101.

In the client-side apparatus 300, a display control part 907 displays an image received from a camera server which is being accessed, or the state of control of the camera 101 connected to the camera server. An operation input part 908 requests a camera control right from the camera server which is being accessed, or instructs the camera 101 to alter the state of panning, tilting or the like, or inputs set values of camera parameters.

Incidentally, in such camera control system, one or more cameras may be connected to the camera server 100.

In the following description, for the sake of simplicity, it is assumed that control terminals in each of which a camera server and a client-side apparatus are integrated are connected to a network.

FIG. 2 is a detailed explanatory block diagram of the construction of a control terminal which corresponds to the aforesaid camera server and client-side apparatus. In the construction of a control terminal 20 which is shown in FIG. 2, a CPU 1 secures a work area by downloading into a RAM 14 either of an OS (operating system) 4 and a camera control program 5 which are stored in a secondary storage 3, and collectively controls the entire control terminal 20 or transmits a control command to a camera 12 via a network 13.

The secondary storage 3 stores the OS 4, the camera control program 5 and the like, and is a magneto-optical disk (MO), a compact disc (CD-ROM), a hard disk, a floppy disk or the like.

The OS 4 is basic software for processing the operation of the control terminal 20, and the camera control program 5 is software for generating a camera control signal for panning, tilting, zooming or the like of the camera 12, and for performing A/D or D/A conversion of an image signal or applying predetermined processing such as compression or expansion to an image signal. The camera control program 5 performs management of an image display area and a display area for a camera control GUI 21 (to be described later) in a display part 7, or performs display processing such as "Move", "Deform" and "Scale".

Figure 4:
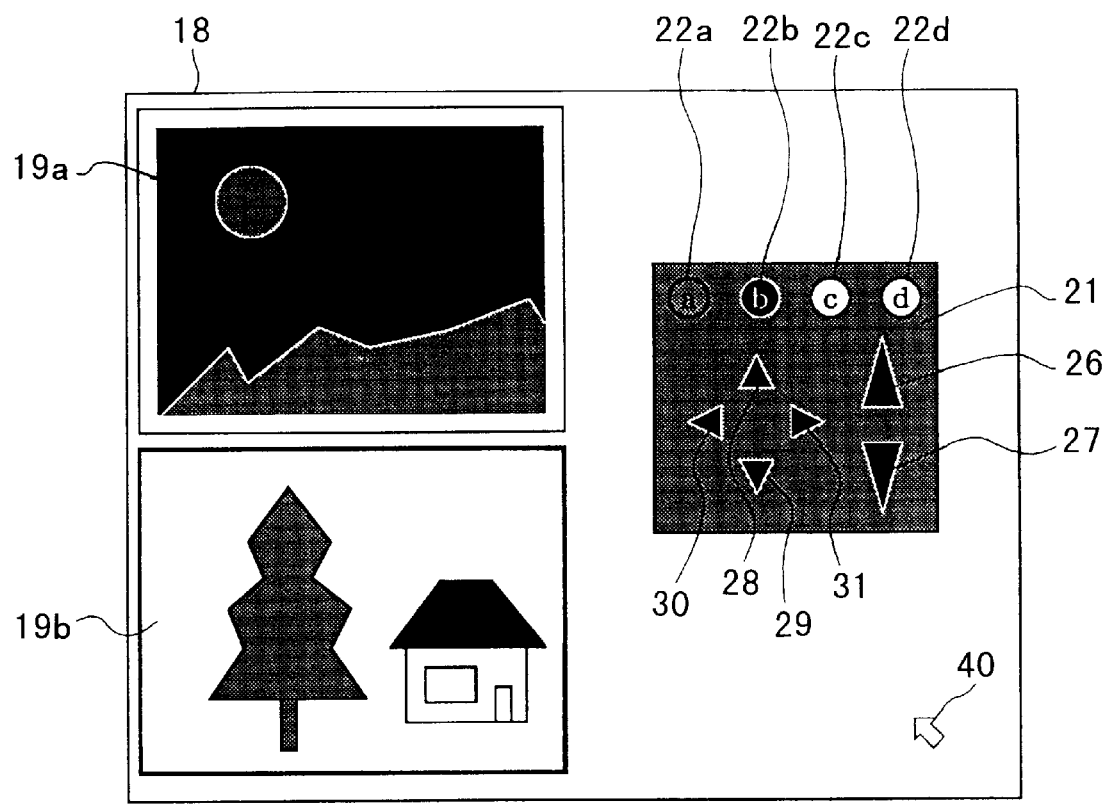
FIG. 4 is a view showing a display example on a display screen according to the embodiment of the present invention.

An input part 6 is provided with a keyboard and a pointing device such as a mouse, and plays the role of allowing a user to input a control command for the camera 12 through the camera control GUI 21 shown in FIG. 4. The display part 7 includes a display device which is a bit-map display, a CRT or an LCD, and displays a picked-up image or the camera control GUI 21 for operating the camera 12 via the network 13.

The panning, tilting or zooming operation of the camera 12 can be continuously controlled, and an image processing device 9 performs A/D conversion of an image signal sent from the camera 12 or another terminal and image processing such as compression or expansion of an image signal, and displays the obtained image on the display part 7 or at another control terminal 20 via the network 13.

A camera I/F 10 transmits a camera control signal to the camera 12. A network I/F 11 performs communication with another control terminal 20 connected to the network 13, via the network 13. At this time, the network I/F 11 performs processing corresponding to the kind of network (such as Ethernet or ATM).

As described previously, if the CPU 1 is to execute various kinds of control, the RAM 14 provides a work area to the CPU 1 when the CPU 1 downloads the OS 4 stored in the secondary storage 3 into the RAM 14. A ROM 15 is a storage medium which stores various programs similarly to the secondary storage 3.

The above-described constituent elements of the control terminal 20 are connected to one another via an internal bath 8 so as to transmit and receive signals to and from one another.

Figure 3:
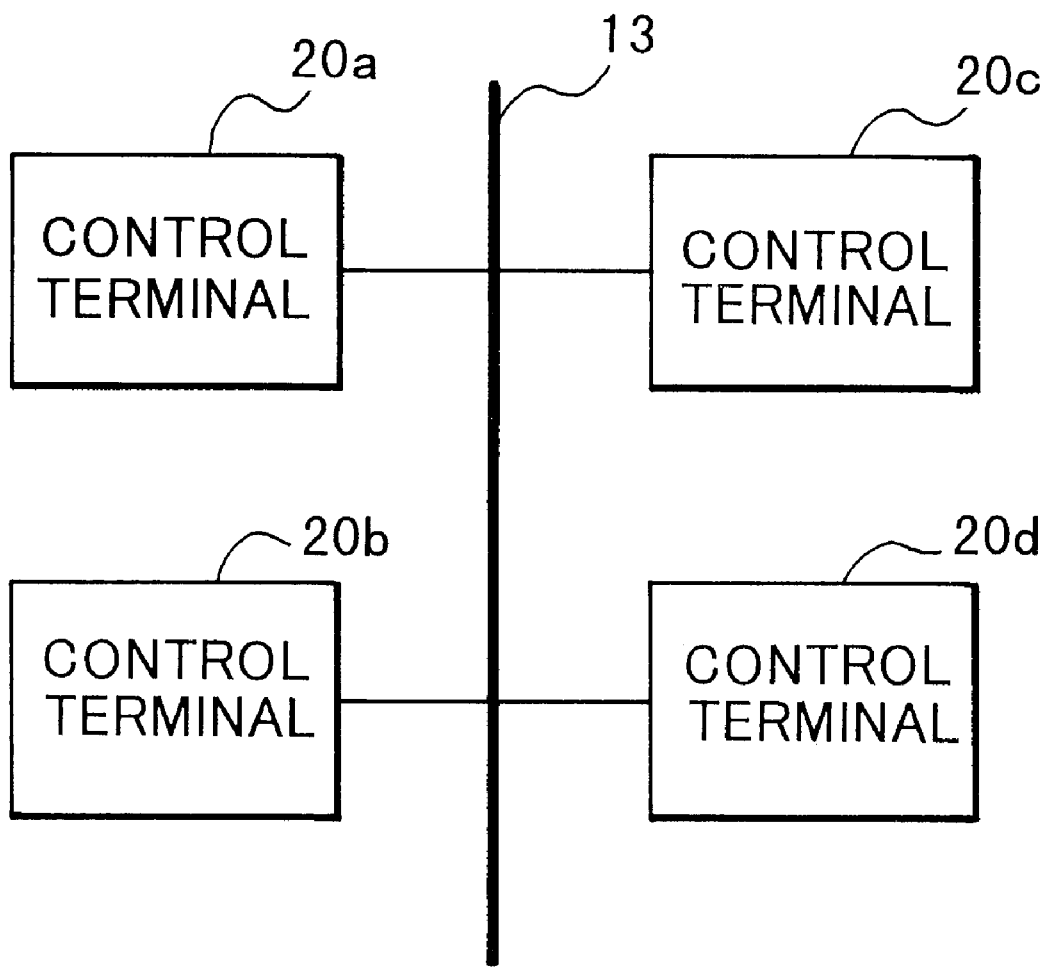
FIG. 3 is a block diagram of the entire camera control system according to the embodiment of the present invention.

FIG. 3 is a block diagram of the entire camera control system in the present embodiment. In FIG. 3, each of control terminals 20a, 20b, 20c and 20d has a construction similar to the control terminal 20 shown in FIG. 2, and each of the control terminals 20a, 20b, 20c and 20d can transmit a signal such as an image signal and a camera control signal to any other control terminal via the network 13. Incidentally, although the present embodiment is provided with four control terminals 20 for the sake of simplicity of description, the number of control terminals is not limited to four.

FIG. 4 is a view showing a display example on the screen of the display part 7 of the present embodiment. In FIG. 4, reference numeral 18 denotes a display screen of the display part 7, and images picked up by cameras connected to the control terminals 20a and 20b are respectively displayed in display areas 19a and 19b. In the example shown in FIG. 4, since images picked up by cameras connected to the control terminals 20c and 20d are not selected for display on the display screen 18, neither of them is displayed on the display screen 18.

The camera control GUI (operating panel) 21 is used for selecting a control terminal to which a camera to be controlled is connected, and controlling a field of view for image pickup and an image pickup magnification of the camera connected to the control terminal selected. In the camera control GUI 21, buttons 22a, 22b, 22c and 22d are used for specifying whether to display on the display screen 18 images picked up by the respective cameras connected to the control terminals 20a, 20b, 20c and 20d, or for specifying which of the cameras connected to the respective control terminals is to be controlled.

An image to be displayed on the display screen 18 is selected in such a way that a user moves a cursor 40 with a mouse (not shown) provided in the input part 6 and clicks on one of the buttons 22a, 22b, 22c and 22d which corresponds to the one of the control terminals 20a, 20b, 20c and 20d to which is connected a camera which is picking up the image desired to be displayed. In the example shown in FIG. 4, the button 22a is clicked on and changed in color, and the image picked up by the camera 12 connected to the control terminal 20a is displayed in the display area 19a.

If the user desires to acquire a control right for any one of the cameras 12 connected to the respective control terminals 20a, 20b, 20c and 20d, the user double clicks on the one of the buttons 22a, 22b, 22c and 22d that corresponds to an image displayed by the above-described operation. Then, the: CPU 1 issues a control right acquisition request and requests a control right from a control terminal to which the desired camera is connected. FIG. 4 shows that the camera 12 connected to the control terminal 20b is in its controllable state, and the button 22b is displayed with its color changed to a further extent and a thick frame which indicates that the camera 12 connected to the control terminal 20b is in the controllable state is displayed in the display area 19b in which the image picked up by that camera 12 is displayed.

Buttons 28, 29, 30 and 31 are respectively used for instructing the controllable camera 12 to move its attitude upward, downward, leftward and rightward. Buttons 26 and 27 are respectively used for varying the image pickup magnification of the controllable camera 12 toward its telephoto end and its wide-angle end.

In the present embodiment, the picked-up images from the cameras connected to the network are displayed on the display screen 18 shown in FIG. 4, without overlapping each other, and the camera control GUI 21 is reduced in scale and moved to and located at a position at which the camera control GUI 21 interferes with as few of the picked-up images as possible.

The processing of display control to be exerted on the display screen 18 by the CPU 1 will be described below with reference to the flowchart shown in FIG. 5. In the following description, it is assumed that the user operates an arbitrary one of the control terminals 20a to 20d.

Figure 6:
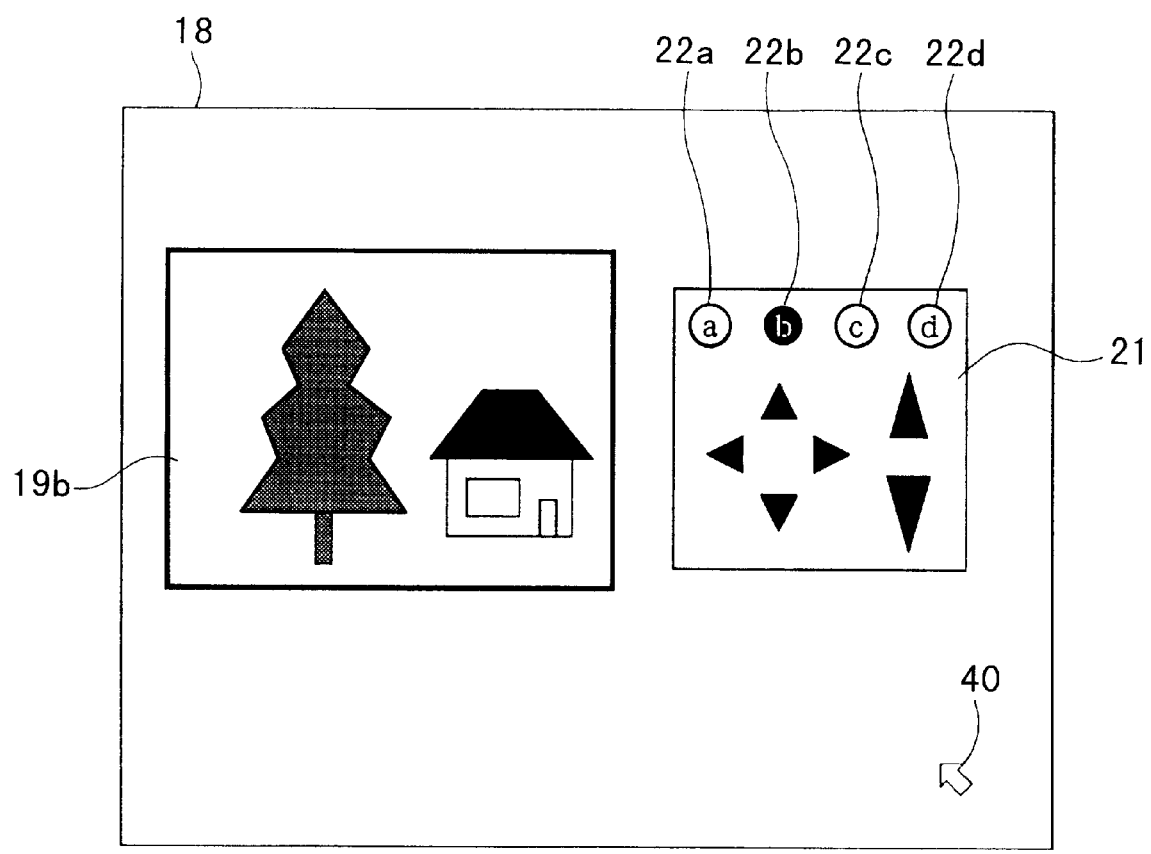
FIG. 6 is a view showing another display example on the display screen according to the embodiment of the present invention.

As shown in FIG. 6, by way of example, it is assumed that the camera control GUI 21 and the display area 19b occupied by the image picked up by the camera 12 controlled by the camera control GUI 21 are displayed on the display screen 18. The camera control GUI 21 and the display area 19b can be moved within the display screen 18 if the user performs a dragging operation to move the cursor 40 with the mouse (not shown).

During the state shown in FIG. 6, if the user desires to newly display on the display screen 18 an image picked up by one or more cameras connected to the control terminals 20a, 20b, 20c and 20d, for example, the camera 12 connected to the control terminal 20a, the user first clicks on the button 22a on the camera control GUI 21 (S101). When the CPU 1 detects the clicking of the button 22a, the CPU 1 requests the control terminal 20a to transmit image data picked up by the camera 12 connected to the same, and acquires the image data (S102).

In addition, the CPU 1 searches in an area list to determine whether an empty area in which to display the image data acquired from the control terminal 20a is present on the display screen 18.

The area list is stored in the RAM 14 in the form shown in FIG. 7 by way of example, and includes the following items: the coordinate values of the upper left point and the lower right point of a maximum area of the display screen, the coordinate values of the upper left point and the lower right point of the title of a picked-up image being currently displayed (the name of the control terminal to which the camera is connected), and the coordinate values of the upper left point and the lower right point of the camera control GUI 21, as well as data indicating whether the control terminal to which the camera picking up the image is connected is a target for camera control. If one of the display areas 19a and 19b and display areas 19c and 19d or the camera control GUI 21 is moved by the operation of the user, the CPU 1 recognizes a position which has been reached by the one moved by the user, and rewrites the area list stored in the RAM 14.

In area search, a maximum rectangular area on the display screen 18 is searched for, other than an image (indicated at 19b in FIG. 6) from a control terminal which is currently displayed on the display screen 18 (S103).

Then, the CPU 1 determines whether the maximum rectangular area is sufficiently large to display a new image (S104). If there is no sufficient empty area, the CPU 1 moves the display position of the currently displayed image and relocate all areas displayed on the display screen 18 (S105), and updates the values of the area list stored in the RAM 14 with the values obtained from such relocation (S106). The process returns to Step S103, in which area search is again performed.

If it is determined in Step S104 that there is an empty area sufficient to display a new picked-up image, the CPU 1 displays the image at an appropriate position in the empty area (S107). Furthermore, the CPU 1 enters the position at which the image is displayed into the area list (S108).

In this manner, in the processing of displaying the image picked up by the camera 12 connected to the control terminal 20a during the state shown in FIG. 6, the display area 19b occupied by the image picked up by the camera 12 connected to the control terminal 20b is moved for relocation within the display screen 18, and the display area 19a is set in the resultant empty area and the image picked up by the camera 12 connected to the control terminal 20a is displayed in the display area 19a so that all the picked-up images are displayed without overlapping each other, as shown in FIG. 4.

Figure 8:
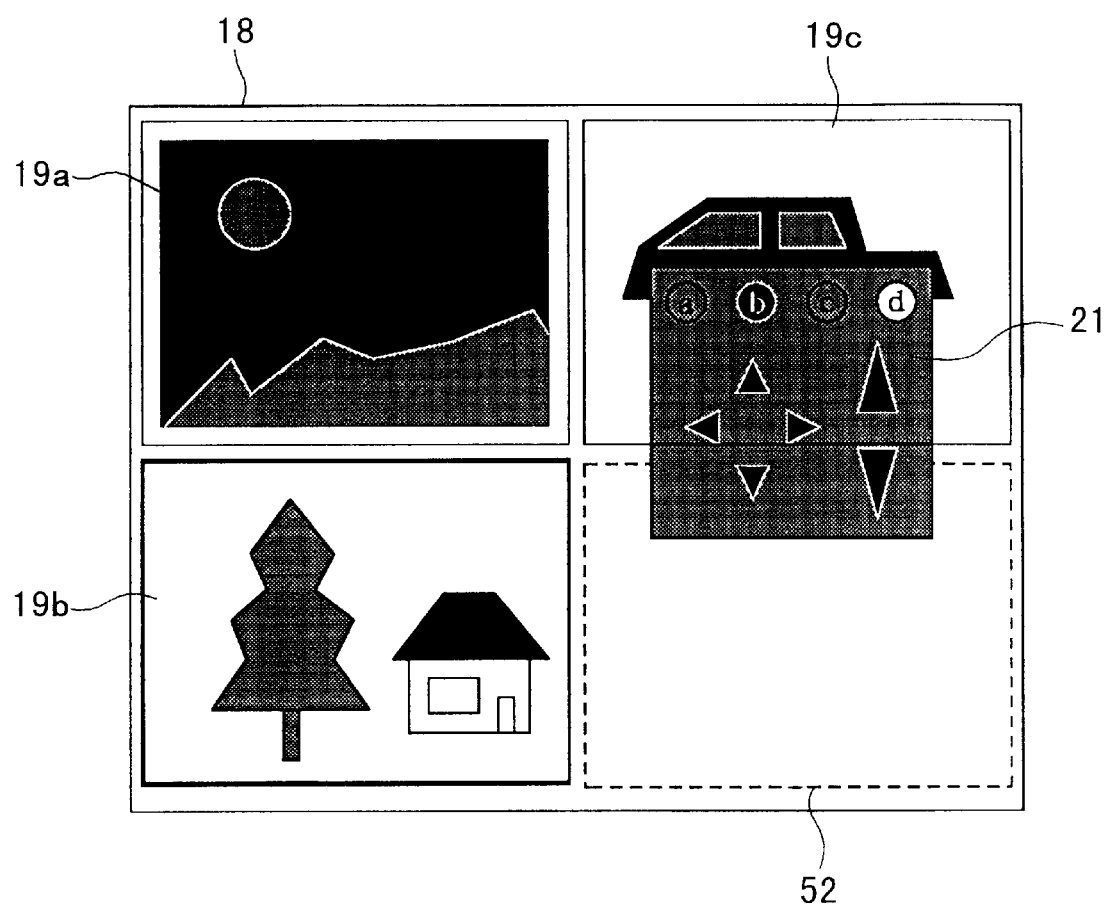
FIG. 8 is a view showing another display example on the display screen according to the embodiment of the present invention.
Figure 9:
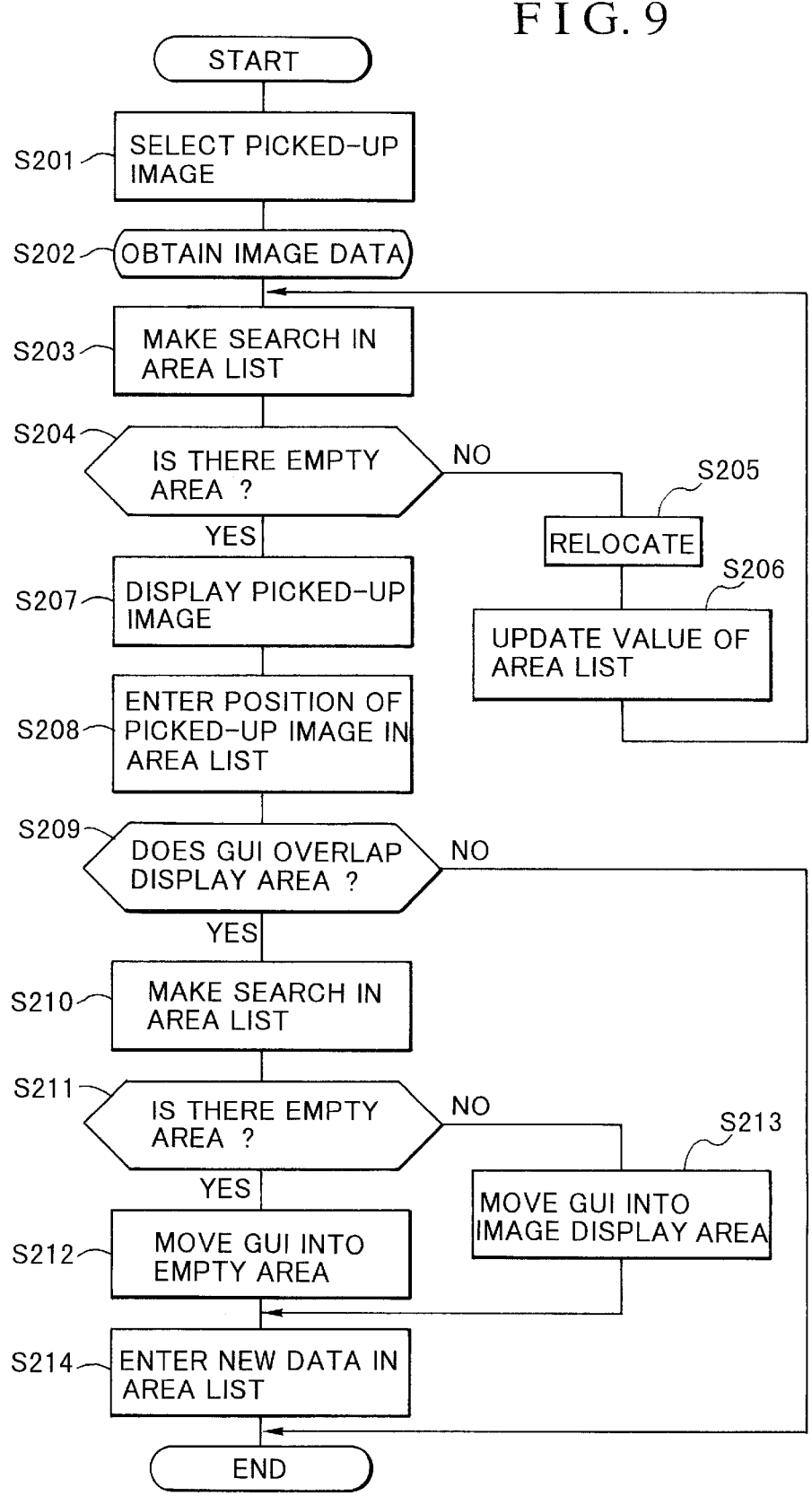
FIG. 9 is a flowchart of the processing of display control executed by the CPU according to the embodiment of the present invention.

The above description has referred to a case where the camera control GUI 21 does not overlap a picked-up image. However, as the number of picked-up images increases further as shown in FIG. 8, it becomes necessary to execute the processing of relocating the camera control GUI 21 so as not to overlap any of the picked-up images. FIG. 9 shows an operational flowchart showing such processing.

By way of example, in the following description, reference will be made to the processing of further displaying an image picked up by the camera 12 connected to the control terminal 20c, on the display screen 18 when it is in the state shown in FIG. 4.

Figure 5:
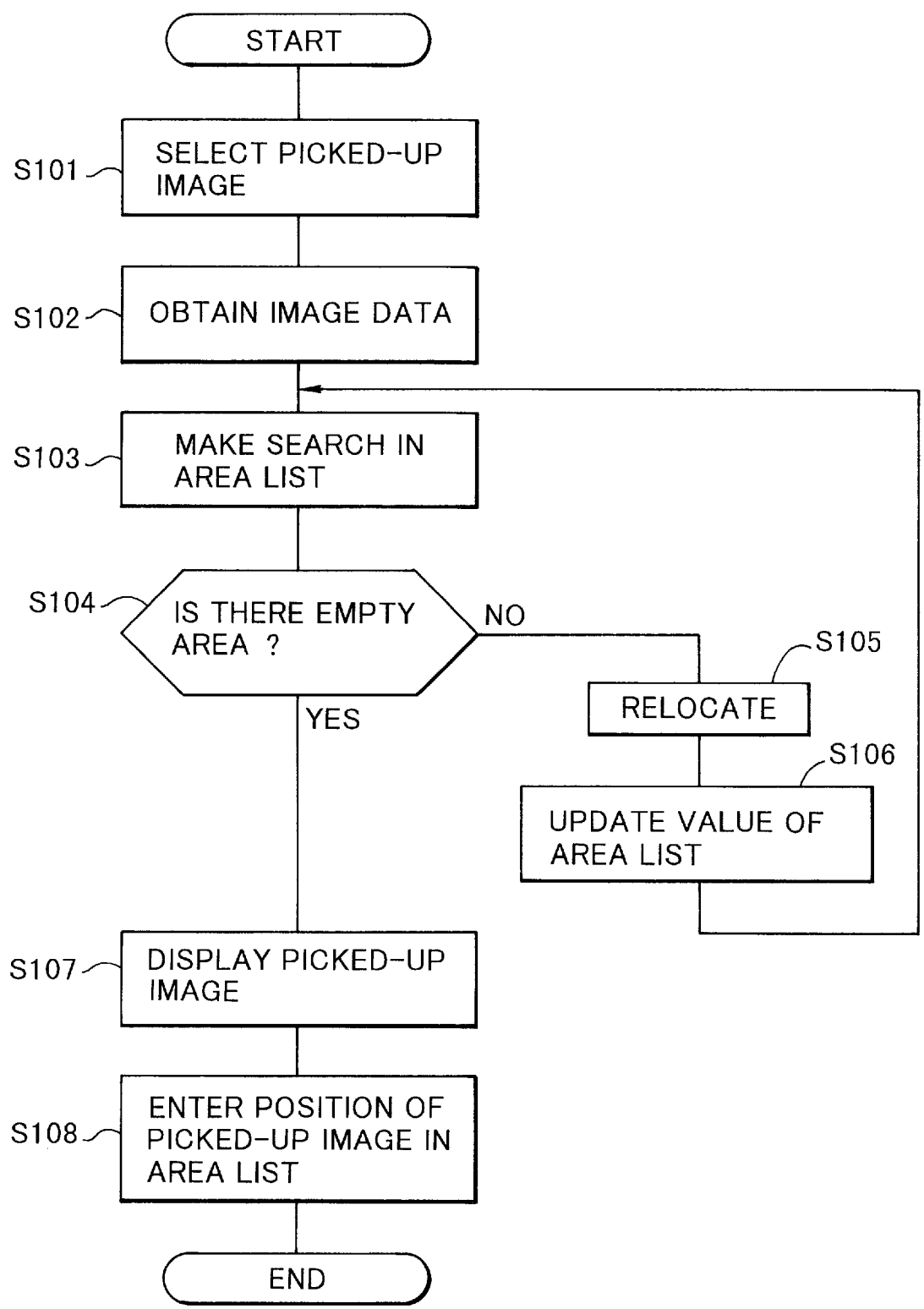
FIG. 5 is a flowchart of the processing of display control executed by a CPU according to the embodiment of the present invention.

In the flowchart shown in FIG. 9, the processing of Steps S201 to S208 is similar to that of Step S101 to S108 of FIG. 5, and the description thereof is omitted.

As shown in. FIG. 8, a newly displayed picked-up image (displayed in the display area 19c in FIG. 8) will occasionally overlap the camera control GUI 21. The CPU 1 again makes a search in the area list and checks whether the camera control GUI 21 overlaps the display area occupied by the new picked-up image (S209). If the camera control GUI 21 does not overlap the display area occupied by the new picked-up image, the process is brought to an end.

Figure 10:
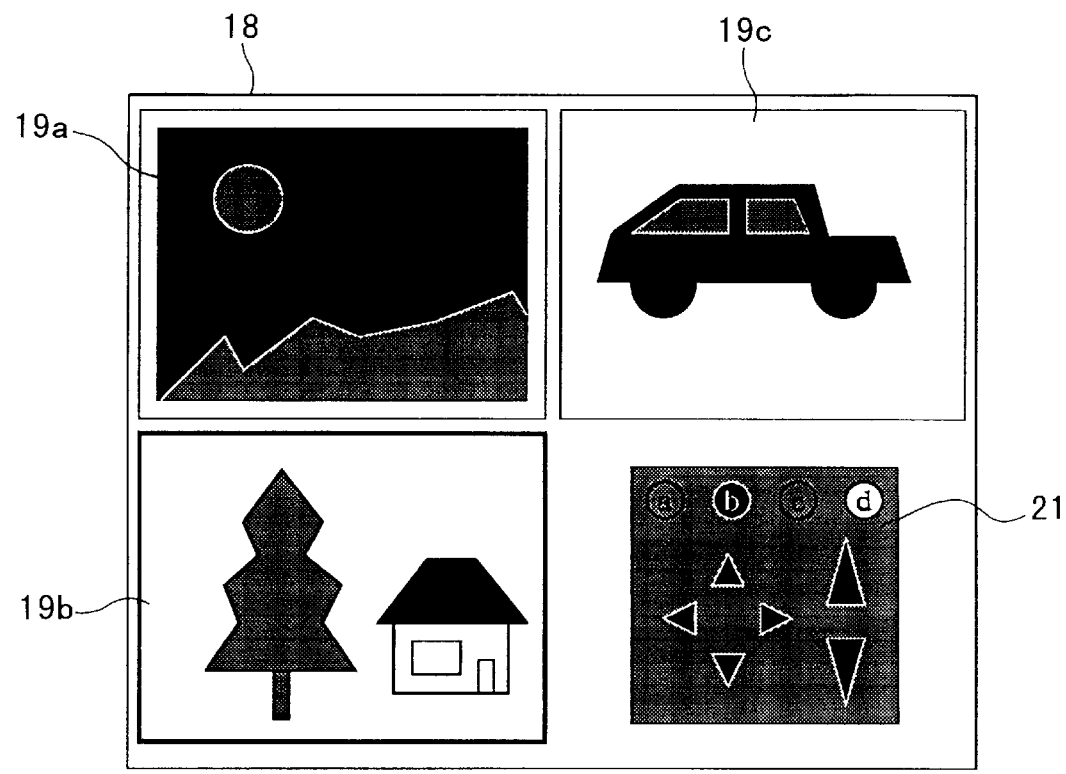
FIG. 10 is a view showing another display example on the display screen according to the embodiment of the present invention.

If the camera control GUI 21 overlaps the display area occupied by the new picked-up image, the CPU 1 searches for an empty area into which to move the camera control GUI 21, in the area list (S210). In the case of FIG. 8, a rectangular frame 52 shown by dashed lines corresponds to such empty area. (The rectangular frame 52 actually is not displayed on the display part 7.) If there is such empty area, the CPU 1 moves the camera control GUI 21 into the empty area (in this case, the rectangular frame 52), as shown in FIG. 10 (S212). In this manner, the picked-up image can be displayed without interfering with the camera control GUI 21.

There is another case where no empty area is present in the display screen 18. For example, as shown in FIG. 11, if a picked-up image is displayed in the display area 19d for the control terminal 20d, in addition to the picked-up images displayed in the display areas 19a, 19b and 19c, nearly the whole of the display screen 18 will be occupied by the image display areas.

In this example, the CPU 1 moves the camera control GUI 21 onto a display area in which the image picked up by the camera 12 connected to a control terminal for which the user does not have a control right is displayed. For example, since the camera 12 connected to the control terminal 20b is in a selected state, the CPU 1 moves the camera control GUI 21 onto a display area other than the display area 20b, for example, the display area 19a in which the image picked up by the camera 12 connected to the control terminal 20a is displayed, as shown in FIG. 11 (S213).

Then, after the completion of the movement of the camera control GUI 21, the CPU 1 updates the area list on the basis of new data (S214). In this manner, if the display areas which display different picked-up images occupy nearly the whole of the display screen 18, the CPU 1 controls the position of the camera control GUI 21 to prevent it from overlapping the image picked up by the camera 12 which can be controlled by the user, whereby the user can view the image picked up by operating that camera 12.

Figure 11:
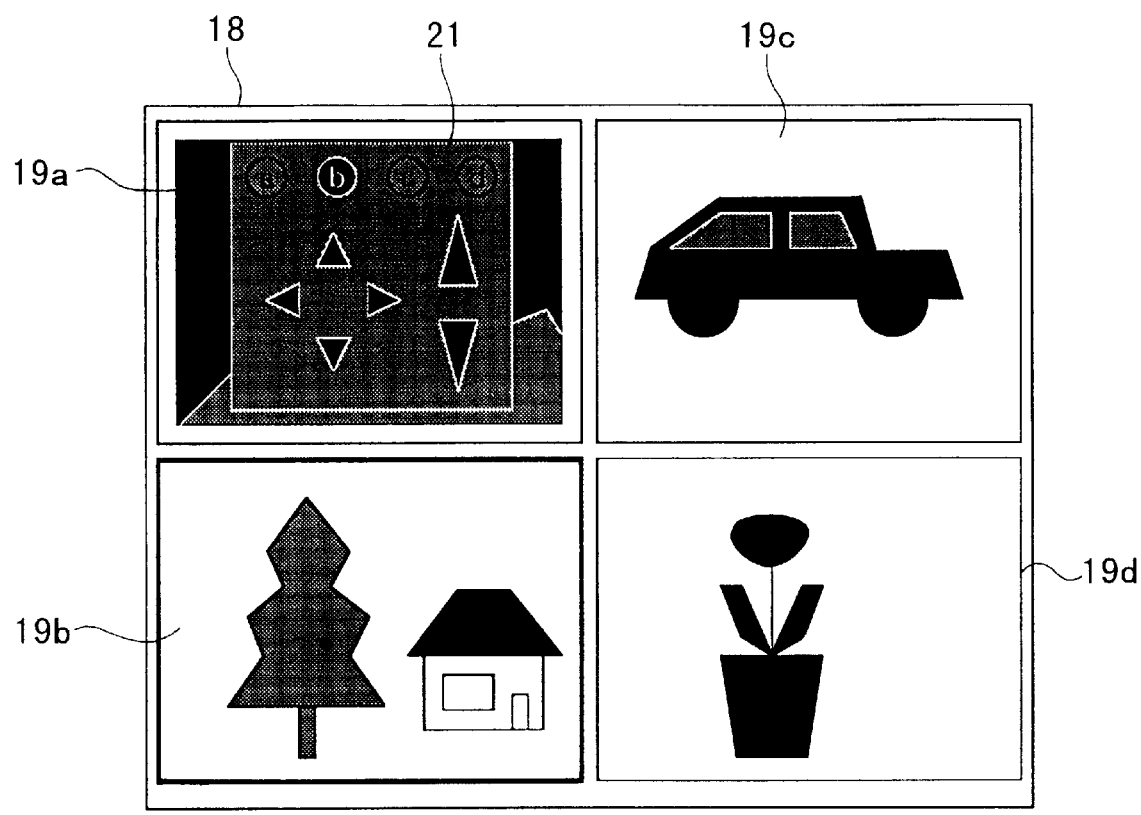
FIG. 11 is a view showing another display example on the display screen according to the embodiment of the present invention.
Figure 12:
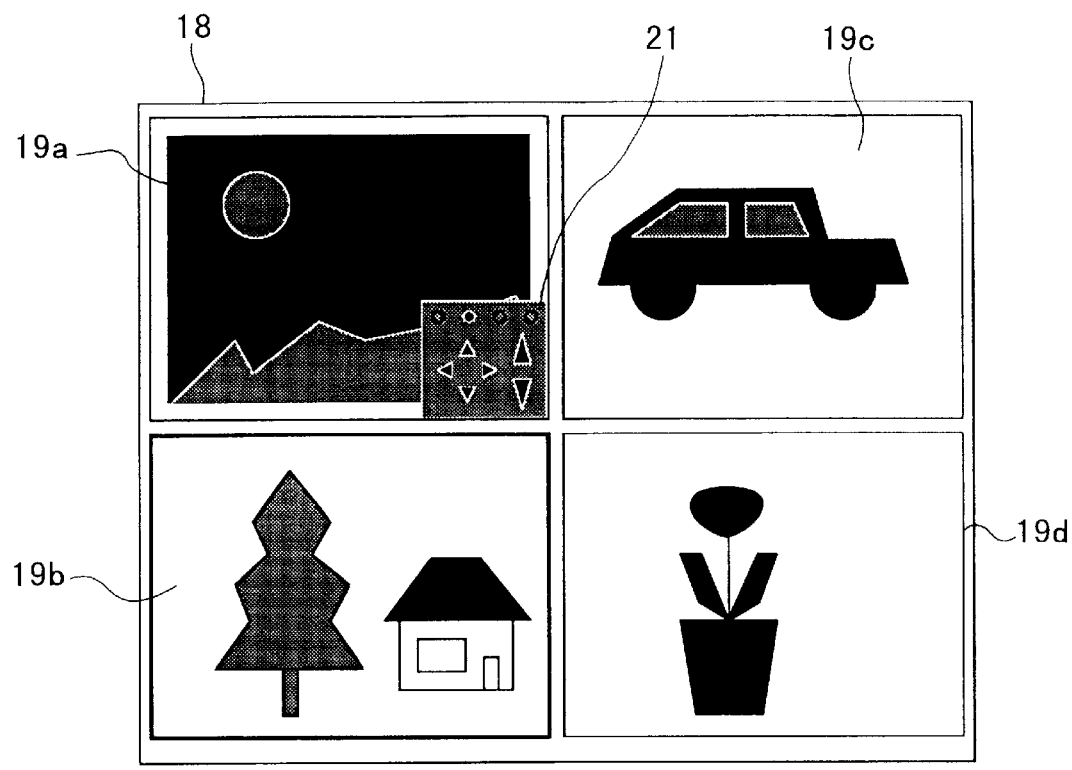
FIG. 12 is a view showing another display example on the display screen according to the embodiment of the present invention.

However, if the display screen 18 is in the state shown in FIG. 11, the user will not be able to view all the picked-up images. For this reason, in the processing operation of Step S214, the CPU 1 may also display the camera control GUI 21 on a reduced scale so that the user can view the picked-up image overlapped by the camera control GUI 21, with the camera control GUI 21 interfering with none of the picked-up images as shown in FIG. 12.

If there is an empty area but there is no area sufficient to normally display the camera control GUI 21, the camera control GUI 21 may be reduced in scale so as to be accommodated into an area into which to move the camera control GUI 21. The reduction in scale of the camera control GUI 21 can be realized, as by reducing the space between buttons or eliminating a blank space.

As is apparent from the foregoing description, in accordance with the present embodiment, picked-up images transmitted from the network are automatically displayed on the display screen without overlapping each other, and furthermore, the camera control GUI 21 is automatically moved into an empty area or displayed on a reduced scale so that the camera control GUI 21 is prevented from interfering with the picked-up images. Accordingly, the user can perform rapid camera control and can also view the picked-up images displayed on the display screen.

Incidentally, it is also possible to achieve the present invention by supplying a system or an apparatus with a storage medium on which the program code of software for realizing the function of the above-described embodiment is recorded, and causing a computer (a CPU or an MPU) of the system or the apparatus to read out and execute the program code stored in the storage medium.

In this case, the program code itself read out from the storage medium realizes the function of the above-described embodiment, and the storage medium which stores the program code constitutes part of the present invention.

The storage medium for supplying such program code may make use of, for example, floppy disk, hard disk, optical disk, magneto-optical disk, CD-ROM, CD-R, magnetic tape, nonvolatile memory card, ROM or the like.

Although the function of the above-described embodiment can be realized by a computer which reads and executes a program code, the function of the above-described embodiment may also be realized by an OS (operating system) running on the computer, in such a way that the OS performs actual processing in whole or part on the basis of an instruction of the program code.

In addition, the function of the above-described embodiment may be realized in such a way that a program code read out from the storage medium is written into either a memory provided in an expansion board inserted in the computer or a memory provided in an expansion unit connected to the computer and a CPU provided on the expansion board or the expansion unit performs actual process in whole or part on an instruction of the program code.

If the present invention is applied to the storage medium, program codes :corresponding to the flowchart described previously are stored in the storage medium. In brief, modules essential to the camera control system according to the present invention are stored in the storage medium.

In the present invention, it suffices to store the program codes of at least three modules in the storage medium. The modules include a searching module for searching for an empty area in the display screen, a moving module for moving a picked-up image and a camera control GUI on the display screen according to an empty area found on the basis of a search result of the searching module, and a reducing mode for reducing in scale the camera control GUI.

As is apparent from the foregoing description, in accordance with the present embodiment, in an apparatus capable of selectively controlling one or more remote cameras which are connected to each other, for example, via a network, an image from such one or more cameras and a camera control interface are displayed on a display screen without overlapping each other, and if there is no sufficient empty area in the display screen, the camera control interface is displayed on a reduced scale without interfering with images from the cameras. Accordingly, even if the number of images displayed on the display screen is large, a user can view all of the displayed images and perform rapid camera control.

What is claimed is:

1. A camera operation system for displaying on display a picked-up image obtained from camera, comprising:
   a communicating device adapted to communicate with said cameras; and
   a display processing device adapted to display images obtained from said cameras in a predetermined size, and a common graphical user interface in a predetermined size for inputting a command to operate said cameras, on the display screen,
   wherein said display processing device determines whether said graphical user interface obstructs displaying the image of a selected camera as a target of user's operation by said common graphical user interface, and said display processing device moves said graphical user interface so as not to overlap each other in response to a determination that said graphical user interface obstructs displaying the image.

2. A camera operation system according to claim 1, wherein said display processing device searches for an empty area on said display screen, other than the display area occupied by areas including the image, and moves said graphical user interface on the empty area.

3. A camera operation system according to claim 2, wherein if the empty area found by said image processing device does not satisfy a predetermined condition, said display device relocates the display area occupied by the areas including the image displayed on the display screen.

4. A camera operation system according to claim 2, wherein if the empty area found by said display processing device does not satisfy a predetermined condition, said display device reduces said graphical user interface in scale and causes said graphical user interface to be display on the display screen on a reduced scale.

5. A control method for displaying a picked-up image obtained from cameras, on a display seen, comprising;
   displaying step of displaying images obtained from said cameras in a predetermined size, and a common graphical user interface, which inputs a command to operate the camera on the display screen in a predetermined size on the display screen; and
   a control step of determining whether said common graphical user interface obstructs displaying the image of a selected camera as a target of user's operation by said common graphical user interface, and moving said common graphical user interface so as not to overlap each other in response to a determination that said graphical user interface obstructs displaying the image.

6. A control method according to claim 5, wherein said control step searches for an empty area on the display screen, other than the display area occupied by areas including the image displayed by said displaying step, and moves said graphical, user interface on the empty area.

7. A control method according to claim 6, wherein if the empty area found by said control step does not satisfy a predetermined condition, said control step relocates the display area occupied by the areas including the image displayed on the display screen.

8. A control method according to claim 6, wherein if the empty area found by said control step does not satisfy a predetermined condition, said control step reduces the graphical user interface in scale and causes the graphical user interface to be displayed on the display screen on a reduced scale.

9. A storage medium which stores a program for executing processing for displaying a picked-up image obtained from cameras, on a display screen, said storage medium allowing said cameras operation system to execute the following processing:
   displaying images obtained from said cameras on the display screen in a predetermined size, with common graphical user interface, which inputs a command to operate said cameras on the display screen;
   determining whether said common graphical user interface obstructs displaying the image of a selected camera, as a target of user's operation by said common graphical user interface; and
   moving said common graphical user interface so as not to overlap each other in response to a determination that said graphical user interface obstructs displaying the image.

10. A storage medium which stores the program for executing processing for the camera operation system, according to claim 9, further allowing the camera operation system to execute the following processing:

searching for an empty area on the display screen, other than the display area occupied by areas including the image displayed on the display screen, and moving said graphical user interface on the empty area.

11. A storage medium which stores the program for executing processing for the camera operation system, according to claim 10, further allowing the camera operation system to execute the following processing:

relocating the display area occupied by the areas including the image displayed on the display screen, if the empty area found does not satisfy a predetermined condition.

12. A storage medium which stores the program for executing processing for the camera operation system according to claim 10, further allowing the camera operation system to execute the following processing:

if the empty area found does not satisfy a predetermined condition, reducing the graphical user interface in scale and causing the graphical user interface to be displayed on the display screen on a reduced scale.

13. A camera operation system according to claim 1, wherein the display area of the image of the camera is the target of user's operation.

14. A control method according to claim 5, wherein said the display area of the image of the camera is the target of user's operation.

15. A storage medium according to claim 9, wherein the display area of the image of the camera is the target of user's operation.

* * * * *

UNITED STATES PATENT AND TRADEMARK OFFICE
CERTIFICATE OF CORRECTION

PATENT NO. : 6,538,663 B2 Page 1 of 1
DATED : March 25, 2003
INVENTOR(S) : Yoichi Kamei It is certified that error appears in the above-identified patent and that said Letters Patent is hereby corrected as shown below:

Column 1,
Line 36, delete "oh" and insert -- on --.

Column 6,
Line 18, delete "the:" and insert -- the --.

Signed and Sealed this

Seventh Day of October, 2003

JAMES E. ROGAN
*Director of the United States Patent and Trademark Office*